United States Patent [19]
McDonald et al.

[11] Patent Number: 5,946,272
[45] Date of Patent: Aug. 31, 1999

[54] IMAGE CONVERSION FOR A SCANNING TOROIDAL VOLUME SEARCH SONAR

[75] Inventors: Robert J. McDonald; Jo Ellen Wilbur; Robert C. Manning, all of Panama City Beach; Lisa B. Tubridy, Panama City, all of Fla.

[73] Assignee: The United States of America as represented by the Secretary of the Navy, Washington, D.C.

[21] Appl. No.: 09/138,053

[22] Filed: Aug. 17, 1998

[51] Int. Cl.$^6$ ........................................... G01S 15/89
[52] U.S. Cl. ................................................. 367/88
[58] Field of Search ...................................... 367/88

[56] References Cited

U.S. PATENT DOCUMENTS 5,506,812  4/1996  Zehner ........................................ 367/88
5,781,504  7/1998  Manning ..................................... 367/88

*Primary Examiner*—Daniel T. Pihulic
*Attorney, Agent, or Firm*—Harvey A. Gilbert; Donald G. Peck

[57] ABSTRACT

A method is provided to compress and display received data from a toroidal volume search sonar (TVSS) in terms of horizontal range. For any TVSS receive beam having a horizontal component projection that is equal to or greater than a selected horizontal range, the data values occurring at that selected horizontal range are averaged to form a compressed data value. Range dependent weight factors are applied during the averaging process so that the effects of surface and bottom reverberation do not bias the compressed data value. The compressed data value can then be displayed as a function of horizontal range for a series of sonar pings in order to provide a time history.

14 Claims, 2 Drawing Sheets

IMAGE CONVERSION FOR A SCANNING TOROIDAL VOLUME SEARCH SONAR

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to toroidal volume search sonar (TVSS) systems and more particularly to a method of compressing the two-dimensional output vector (radial range, angle) of the beamformed output of a TVSS into a one-dimensional output vector (horizontal range) that can be displayed as a function of time to provide a time history.

BACKGROUND OF THE INVENTION

A toroidal volume search sonar (TVSS) has successfully been used in detecting mine-like objects in shallow water. The toroidal shaped array configuration used in the TVSS has advantages over a standard linear shaped array for mine detection in shallow water because the TVSS configuration allows the construction of very narrow (vertical width) beams, which can penetrate deeply into a shallow water column. Exemplary of the prior art TVSS is the description in the U.S. Pat. No. 5,506,812 to W. J. Zehner. A beamforming methodology for TVSS in shallow water is disclosed in U.S. patent application Ser. No. 08/869,722, now U.S. Pat. No. 5,781,504, filed Jun. 5, 1997, and assigned to the same assignee as the present application.

For each sonar ping, the beamformed output of a TVSS consists of many radial receive beams. The large number of beams present the sonar operator with a considerable amount of visual information which must be assessed at every ping (typically once a second). The standard polar display for each ping of a TVSS displays the range and radial beam angle to a target to provide information about where in the water column a target is located. However, some form of a time (ping) history would greatly aid a sonar operator in identifying a target of interest since anomalous events could more easily be distinguished from a background reference over a time period covering many pings. Yet, because of the two-dimensional radial nature of the TVSS display, a time history of past radial images is difficult for an operator to view since it would involve a three-dimensional image (range, beam angle and time). Thus, there is a need for some form of data compression if TVSS data is to be presented as a function of time on a two-dimensional display.

SUMMARY OF THE INVENTION

Accordingly, it is an object of the present invention to provide a method presenting TVSS data with a time history.

Another object of the present invention is to provide a method of compressing TVSS data such that it can be presented as a function of time on a two-dimensional display.

Still another object of the present invention is to provide a method of compressing shallow-water scanned TVSS data that compensates for surface and bottom reverberation effects.

Other objects and advantages of the present invention will become more obvious hereinafter in the specification and drawings.

In accordance with the present invention, a method of displaying received data from a toroidal volume search sonar (TVSS) in terms of horizontal range is provided. Each of a plurality of data values from the TVSS represent a sonar return detected within a receive beam at a radial range and a beam angle that the receive beam makes with a horizontal datum passing through the TVSS. A horizontal range of interest is selected a distance from the TVSS along the horizontal datum. For any receive beam having a horizontal component projection on the horizontal datum that is equal to or greater than the selected horizontal range, the data values occurring at that selected horizontal range are averaged to form a compressed data value. The compressed data value can then be displayed as a function of horizontal range. In shallow water scenarios, weight factors are applied to the data values associated with the first and last receive beams having a horizontal component projection on the horizontal datum that is equal to or greater than the selected horizontal range. In this way, the biasing of the compressed data values due to the effects of surface and bottom reverberation is minimized.

DETAILED DESCRIPTION OF THE INVENTION

The present invention is a method applied to the beamformed output of a toroidal volume search sonar (TVSS) having receive beams scanned along the surface and the bottom of a body of water. Briefly, the method compresses the TVSS two-dimensional (radial range, angle) output vector into a one-dimensional (horizontal range) output vector in such a manner as to maximize receive beam area coverage, yet avoid the biasing effects that surface and bottom reverberation would normally impart on such a data compression process. The one-dimensional (horizontal range) vector is of great benefit because a series of the one-dimensional data vectors (i.e., one for each ping) can be concatenated to form a new two-dimensional (horizontal range, time) image. Such a two-dimensional image not only gives a visual time history, thus improving an operators ability to detect a target, but also allows for the application of advanced image processing techniques for the computer aided detection and classification of targets.

Compression of the radial range and beam angle data into a horizontal range vector must take into consideration the tradeoff between increasing area coverage and decreasing the probability of detecting a target due to the effects of surface and bottom reverberation. That is, in attempting to maximize the area covered, the process of compressing the two-dimensional image (radial range beam angle) into a one-dimensional horizontal range vector can result in a reduced ability to distinguish surface and bottom reverberation from a target located in the water column. If one decides to define individual cutoff points for each beam prior to the start of significant surface and/or bottom reverberation, then the area covered by the sonar is severely reduced and targets located in these regions may go undetected. Accordingly, the present invention compresses the beamformed output using a range dependent weighting scheme that accounts for the overlapping beam areas covered by beams adjacent to the scanning beams.

Figures 1, 2:
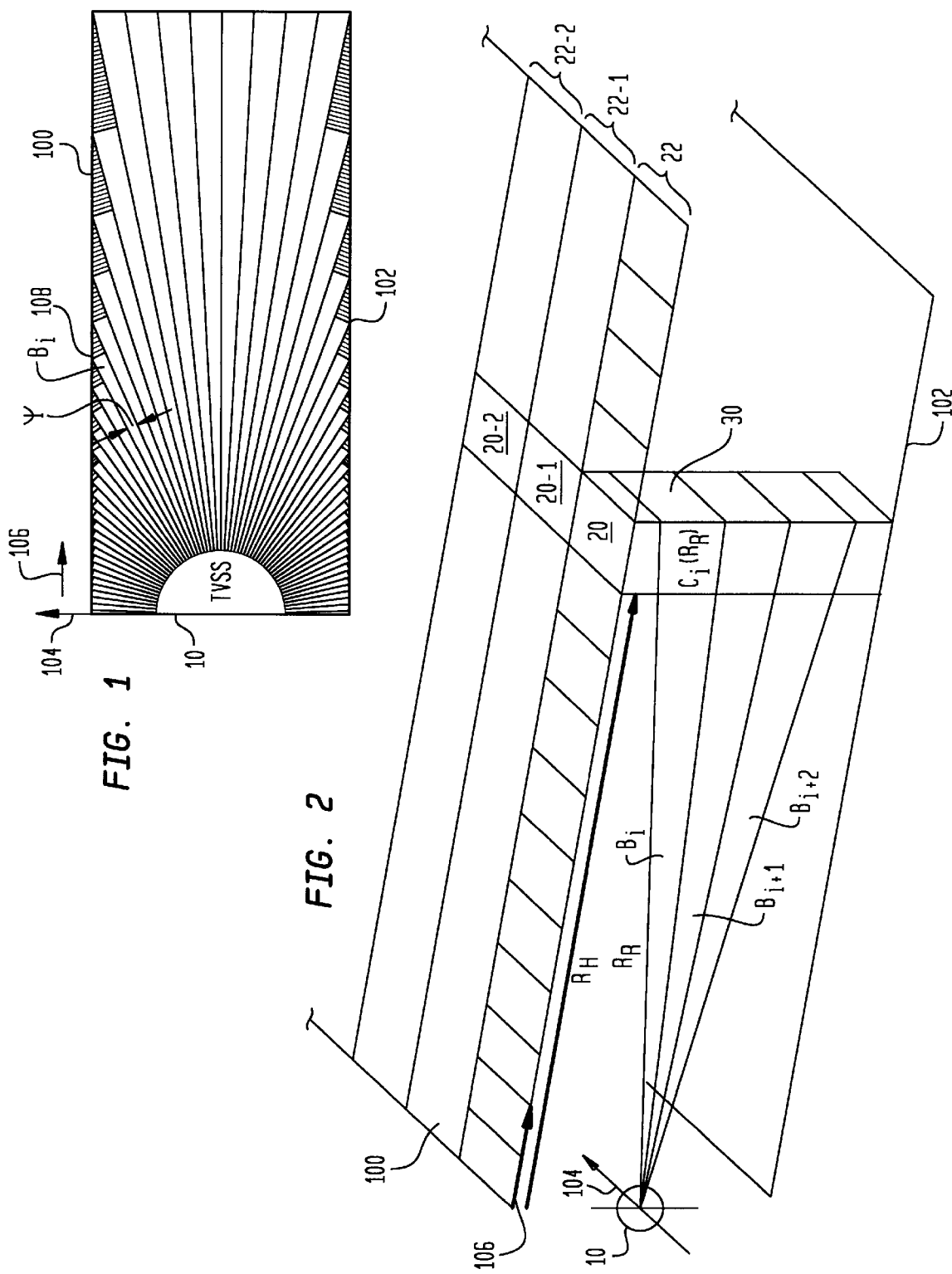
FIG. 1 is a schematic illustration of a TVSS receive beam coverage pattern for shallow water.
FIG. 2 is a schematic illustration of the present invention where range cell values in the horizontal range versus the along track image plane are obtained by an averaging procedure involving the radial range cells in the radial range versus beam angle plane.

Referring now to the drawings, and more particularly to FIG. 1, the starboard side receive beam coverage geometry of a TVSS 10 is illustrated schematically for a shallow water scenario. The surface of a body of water is indicated at 100 and the bottom of the body of water is indicated at 102. For purpose of description, it will be assumed that the direction of travel of TVSS 10 is orthogonal to the radial plane as labeled by arrow 104. Accordingly, horizontal range relative to TVSS 10 extends in the direction indicated by arrow 106. Each receive beam $B_i$ has a beamwidth $\Psi$ defined in terms of the angular separation (in degrees) between two points located a given distance down (in decibels (dB)) from the peak of the beam pattern main lobe. For example, the 3 dB beamwidth for a receive beam $B_i$ would be the angular separation (in degrees) between two points on the beam pattern main lobe which are located halfway (3 dB) down from the peak. The beam cutoff occurs at points where the specified beam down point intersects either surface 100 or bottom 102. For receive beams $B_i$, this point of intersection or cutoff location is illustrated at 108. Areas not covered by any of the receive beams is hatched. Accordingly, at cut off locations such as 108, a scanning TVSS beamformer could be configured to steer individual receive beams to keep the specified beam down point along either surface 100 or bottom 102 to fill in the hatched areas to cover the entire water column. Such a scanning process is described in U.S. patent application Ser. No. 08/869,722, now U.S. Pat. No. 5,781,504, filed Jun. 5, 1997, the disclosure of which is hereby incorporated by reference.

The present invention assumes that the beamformed data is available from TVSS 10 where the specified beam down point of each receive beam has been scanned along the surface or bottom interface. Further, it is also assumed that the scanning start points for each receive beam $B_i$, in terms of the radial range at which the specified beam down point intersects the surface or bottom interface, are also available.

FIG. 2 provides a conceptual overview of the present invention. TVSS 10 provides the two-dimensional (radial range, beam angle) beamformed data for each receive beam $B_i$ at a plurality of radial range cells. That is, for each receive beam $B_i$, there exists a data value (i.e., sonar return) associated with a radial range cell 30 at a radial range $R_R$. This data value is designated $C_i(R_R)$. The present invention compresses the data values associated with radial range and beam angle into either a one-dimensional cell, or a strip of such one-dimensional cells, as a function of only horizontal range, i.e., in the direction of arrow 106. Briefly, for a given horizontal range $R_H$, the data values associated with any receive beam $B_i$ having a horizontal component equal to or greater than $R_H$ are averaged to define a new compressed data value associated with the horizontal range $R_H$. Since the systems utilizing the present invention will typically be digital in nature, the horizontal range can be handled as discrete cells with a horizontal range cell for horizontal range $R_H$ being referenced by numeral 20. If the averaging process is repeated for a plurality of horizontal ranges $R_H$, a one-dimensional vector or strip of compressed data values is formed as illustrated by strip 22. Each cell 20 or strip 22 provides target range information while discarding target depth.

Typically, strip 22 would be generated for a single sonar ping. Accordingly, if the averaging process is repeated for a number of sonar pings over a period of time, each successive cell or strip (e.g., cells 20-1, 20-2, or strips 22-1, 22-2) adds a time history component to target range. Thus, horizontal range as a function of time can be illustrated and comprehended easily on a two-dimensional display. For complete coverage, the averaging is performed for values of $R_H$ spanning the minimum to maximum range of TVSS 10.

As mentioned above, the compression process must ensure that the entire water column is covered and that surface and bottom reverberation are properly considered as will now be explained with the aid of FIG. 3. The receive beams of TVSS 10 are considered scanned when the specified beam down point 108 (e.g., 3 dB down point) of a receive beam (e.g., beam $B_i$) intersects the surface 100 (or bottom 102) interface. The present invention uses a horizontal range scanning start and stop points for each receive beam $B_i$. While this information can be provided, it can also be easily calculated as follows.

Based on the known depth d of TVSS 10 beneath surface 100, the known height h of TVSS above bottom 102, the specified beamwidth $\Psi$ defined by the specified dB down points and the angle $\phi_i$ that the centerline of receive beam $B_i$ makes with the horizontal axis 110 of TVSS 10, the horizontal range at which receive beam $B_i$ starts to scan is calculated as follows. If receive beam $B_i$ is located above horizontal axis 110, then the specified beam down point of receive beam $B_i$ intersects surface 100 at the horizontal range denoted as $R^H_{START,i}$ or $$R^H_{START,i} = \frac{d}{\tan(\varphi_i + \psi/2)} \tag{1}$$

However, if receive beam $B_i$ were located below horizontal axis 110, then the known depth quantity d is replaced with the known height quantity h in equation (1). Because the receive beams $B_i$ of TVSS 10 are contiguous, the horizontal stop point, denoted $R^H_{STOP,i}$, for receive beam $B_i$ is also the horizontal scanning start point for receive beam $B_{i+1}$. Accordingly, $$R^H_{STOP,i} = R^H_{START,i+1} \tag{2}$$

Thus, in the ensuing description, it is only necessary to discuss the region between $R^H_{START,i}$ and $R^H_{START,i+1}$ since a similar geometry arises for all other adjacent receive beam pairs.

As described above, it is necessary to know what receive beams have a horizontal component of length equal to or greater than a given horizontal range $R_H$, where $R_H$ is located between $R^H_{START,i}$ and $R^H_{STOP,i}$. A receive beam $B_i$, which may be a beam that is scanned between $R^H_{START,i}$ and $R^H_{STOP,i}$, and which is located above horizontal axis 110 and having a centerline that makes an angle $\phi_i$ with horizontal axis 110 will have a horizontal component equal to or greater than a given horizontal range $R_H$ if $$\varphi_i < \tan^{-1}\left(\frac{d}{R_H}\right) + \left(\frac{\psi}{2}\right) \tag{3}$$

However, if receive beam $B_i$ is located below horizontal axis 110, then the known depth quantity d is replaced with the known depth quantity h in equation (3). Thus, for a given horizontal range $R_H$, there are N distinct beams that will satisfy equation (3). The first and N-th beams are scanning beams with, for example, the first beam scanned along surface 100 and the N-th beam scanned along bottom 102.

Note that the first beam could alternatively be scanned along bottom 102 and the N-th beam scanned along surface 100.

It is now necessary to compute the "average" value of the output of TVSS 10 along a given horizontal range $R_H$ (or $B_i(R_H)$) for all N beams that have a horizontal component equal to or greater than $R_H$. However, it is first necessary to convert $R_H$ into its radial range $R_R$ equivalent. Simple trigonometry yields the following expression for $R_R$, $$R_R = \left(\frac{R_H}{\cos\varphi}\right) \tag{4}$$

where, in general, $\phi$ is the angle that a receive or scanned beam's centerline makes with horizontal datum 110. More specifically, $\phi=\phi_i$ for receive beams $B_i$, i=2 to (N−1), and $\phi=\phi_i-\phi_s$ for scanned beams $B_i$, i=1 and i=N where $\phi_s$ is an angle between the centerline of a scanned beam after the start of the scan and the centerline of the beam at some point during its scan. For example, for the scan from $B_i$ to $B_{i+1}$, the angle $\phi_s$ is as shown in FIG. 3. Since the output of TVSS 10 is typically given at discrete range cells, the calculated value for $R_R$ from equation (4) can be rounded to its nearest integer with the output at the nearest-integer radial range cell $R_R$ being used for $B_i(R_H)$. Alternatively, the output associated with radial range cells before and after the calculated radial range from equation (4) can be used to interpolate a more exact TVSS output at a given $R_H$.

At this point, for each given horizontal range cell $R_H$, located between $R^H_{START}$ and $R^H_{STOP}$, the corresponding radial range cell $R_R$ and the approximated (or interpolated) beamformer output at each of these range cells, designated $B_i(R_H)$, along a given $R_H$ are known. However, because the surface and bottom scanning beams $B_i$ and $B_N$, respectively, overlap the adjacent beams, it is necessary to compute the mean value with special weighting coefficients for the scanning beams. The weighting factors applied to the scanning beams insure that the scanning beams do not bias the average since they partially overlap adjacent beams.

Figure 3:
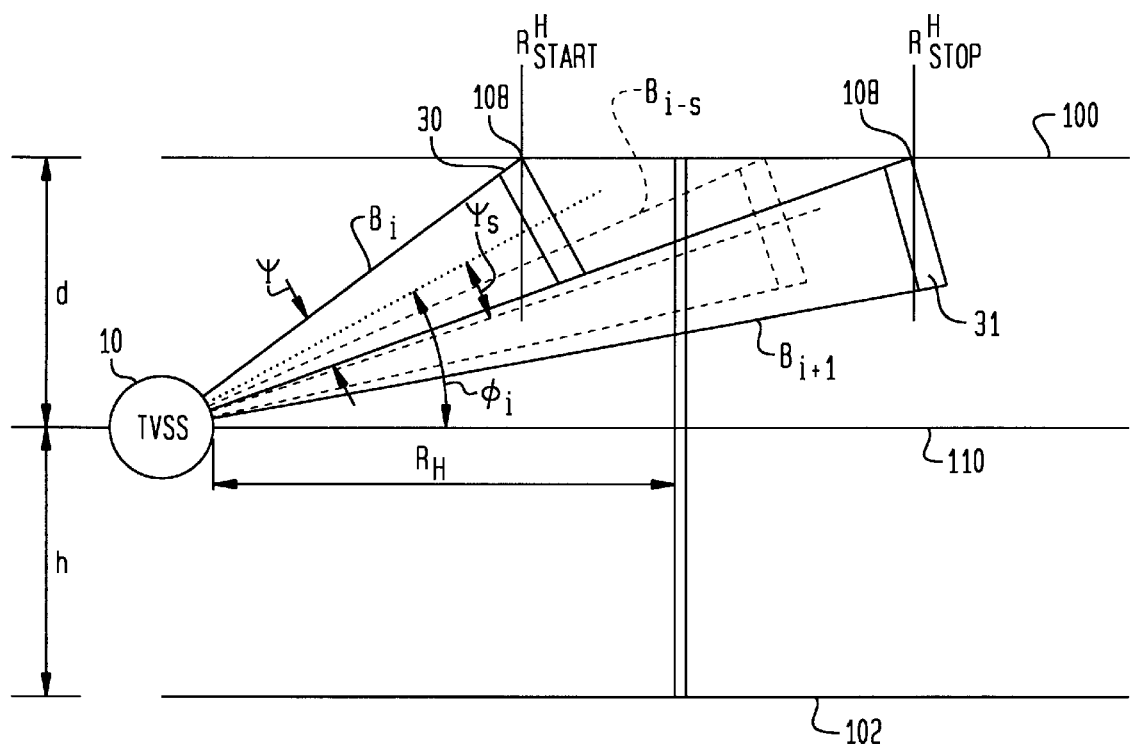
FIG. 3 schematically illustrates details of the geometry associated with the present invention when there is overlap between a scanning beam and an adjacent beam.

Referring to FIG. 3, at range cell 30 where the range is $R^H_{START}$, the scanned beam $B_i$ does not overlap any other beams. As beam $B_i$ has its steering angle changed and scans along surface 100 as referenced by the dotted-line beam $B_{i-s}$, it begins to overlap beam $B_{i+1}$. At range cell 31 where the range is $R^H_{STOP}$, the overlap between scan beam $B_i$ and beam $B_{i+1}$ is 100%. Beyond range cell 31, beam $B_i$ is terminated and beam $B_{i+1}$ is used to scan along surface 100 and eventually overlaps beam $B_{i+2}$ (not shown). To account for this overlap in an averaging process, a weighting factor is applied to the output of the scanning beam. The weight factor is not constant, but changes as a function of the radial range.

Using weighted portions of the scanning beams, a weighted mean of a discrete function is calculated in the present invention by multiplying the weights by the discrete values of the function and then dividing by the sum of the weighting factors. Hence, the following expression may be used to compute $M(B(R_H))$ which represents the mean value for the beamformed output for a scanning TVSS along a horizontal range of $R_H$.

$$M(B(R_H)) = \frac{(w_i * B_i(R_H) + B_{i+1} + \ldots + B_{i+N-2}(R_H) + w_{i+N-1} * B_{i+N-1}(R_H)}{(w_i + w_{i+N-1} + N - 2)} \tag{5}$$

where N is the number of receive beams satisfying equation (3)

$w_i$ is equal to $$\frac{R_H - R^H_{STOP,i}}{R^H_{START,i} - R^H_{STOP,i}} \tag{6}$$

and $w_{i+N-1}$ is equal to $$\frac{R_H - R^H_{STOP,i+N-1}}{R^H_{START,i+N-1} - R^H_{STOP,i+N-1}} \tag{7}$$

The values for $R^H_{START,i}$, $R^H_{STOP,i}$, $R^H_{START,i+N-1}$, and $R^H_{STOP,i+N-1}$ are derived from equations (1) and (2) above and depend on whether receive beam $B_i$ is above or below horizontal axis 110. In equation (5), the weights of the non-scanned beams have been set to one. However, this is not required and there may be applications where individual receive beams are weighted differently.

The advantages of the present invention are numerous. A mean value can be calculated for each value of $R_H$ ranging from the minimum to the maximum range for a TVSS sonar. This process compresses the two-dimensional beamformed TVSS output into a function of a single variable, i.e., horizontal range $R_H$. By repeating and saving the output of the above process for each ping, and then concatenating the one-dimensional vectors in an adjacent manner, a two-dimensional time (ping) history image can be formed.

When the sonar operator examines the water column, a time (ping) history would greatly aid in identifying a target of interest, since anomalous events could more easily be distinguished from a background reference over a period of time (or ping history). The two-dimensional radial nature of the TVSS display makes the visual interpretation of a time history of past radial images difficult for an operator since it would be a three-dimensional image (range, beam angle, time).

The proposed invention will enable the creation of a two-dimensional image in the plane parallel to the sea surface that gives a time ping history by creating a one-dimensional horizontal range vector for each ping without loss of information. The horizontal range vectors for multiple pings can be arranged to form the new two-dimensional (horizontal range, time) image.

The proposed invention is able to distinguish a target in the water column from surface and/or bottom reverberation while at the same time covering the entire water column by using a scanning beamformer and compressing the two-dimensional scanning beamformer output using a range conversion and discrete weighted mean process.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of compressing and displaying received data from a toroidal volume search sonar (TVSS) in terms of horizontal range, comprising the steps of:

providing a plurality of data values from said TVSS, each data value representing a sonar return detected within a receive beam at a radial range and a beam angle that said receive beam makes with a horizontal datum passing through said TVSS;

selecting a horizontal range a distance from said TVSS along said horizontal datum;

averaging, for any said receive beam having a horizontal component projection on said horizontal datum that is equal to or greater than said horizontal range, ones of said plurality of data values occurring at said horizontal range wherein a compressed data value is formed; and displaying said compressed data value as a function of said horizontal range.

2. A method according to claim 1 further comprising the step of repeating said steps of selecting, averaging and displaying for a plurality of unique horizontal ranges.

3. A method according to claim 2 wherein said plurality of unique horizontal ranges span the minimum to maximum range of said TVSS.

4. A method according to claim 1 further comprising the step of repeating said steps of selecting, averaging and displaying for a plurality of sonar returns received over a period of time.

5. A method according to claim 1 further comprising the step of repeating said steps of selecting, averaging and displaying for a plurality of unique horizontal ranges for each of a plurality of sonar returns received over a period of time.

6. A method according to claim 5 wherein said plurality of unique horizontal ranges span the minimum to maximum range of said TVSS.

7. A method of compressing and displaying received data from a toroidal volume search sonar (TVSS) in terms of horizontal range, comprising the steps of:

providing a TVSS at a known depth d beneath the surface of a body of water and a known height h above the bottom of the body of water;

providing a plurality of data values from said TVSS representing sonar returns detected within receive beams $B_i$ at a radial range cell $R_R$ and a beam angle $\phi_i$ that a centerline of each of said receive beams $B_i$ makes with a horizontal datum passing through said TVSS;

selecting a horizontal range $R_H$ a distance from said TVSS along said horizontal datum;

generating a compressed data value in accordance with $$\frac{(w_i * B_i(R_H) + B_{i+1} + \ldots + B_{i+N-2}(R_H) + w_{i+N-1} * B_{i+N-1}(R_H)}{(w_i + w_{i+N-1} + N - 2)}$$

wherein:

N is the number of said receive beams $B_i$ satisfying the relationship $$\varphi_i < \tan^{-1}\left(\frac{Y}{R_H}\right) + \left(\frac{\psi}{2}\right)$$

where Y is equal to said known depth d for each of said receive beams $B_i$ having a corresponding said beam angle $\phi_i$ angled towards the surface with respect to said horizontal datum and where Y is equal to said known height h for each of said receive beams $B_i$ having a corresponding said beam angle $\phi_i$ angled towards the bottom with respect to said horizontal datum, $B_i(R_H)$ is approximately equal to one of said plurality of data values at one radial range cell $R_R$ approximately designated by $$R_R = \left(\frac{R_H}{\cos\varphi}\right),$$

where $\phi$ is an angle between said horizontal datum and a centerline of said receive beam for i=2 to (N−1), and where $\phi$ is an angle between said horizontal datum and a centerline of a scanned beam for i=1 and i=N, $w_i$ is equal to $$\frac{R_H - R_{STOP,i}^H}{R_{START,i}^H - R_{STOP,i}^H},$$

where $$R_{START,i}^H = \frac{X}{\tan(\varphi_i + \psi/2)}$$

where X is equal to said known depth d if said beam angle $\phi_i$ is angled towards the surface with respect to said horizontal datum and where X is equal to said known height h if said beam angle $\phi_i$ is angled towards the bottom with respect to said horizontal datum, and where $$R_{STOP,i}^H = R_{START,i+1}^H,$$

and $w_{i+N-1}$ is equal to $$\frac{R_H - R_{STOP,i+N-1}^H}{R_{START,i+N-1}^H - R_{STOP,i+N-1}^H},$$

where $$R_{START,i+N-1}^H = \frac{(d+h) - X}{\tan(\varphi_{i+N-1} + \psi/2)},$$

and where $$R_{STOP,i+N-1}^H = R_{START,i+N}^H;$$

and displaying said compressed data value as a function of said horizontal range.

8. A method according to claim 7 further comprising the step of repeating said steps of selecting, averaging and displaying for a plurality of unique horizontal ranges $R_H$.

9. A method according to claim 8 wherein said plurality of unique horizontal ranges $R_H$ span the minimum to maximum range of said TVSS.

10. A method according to claim 7 further comprising the step of repeating said steps of selecting, averaging and displaying for a plurality of sonar returns received over a period of time.

11. A method according to claim 7 further comprising the step of repeating said steps of selecting, averaging and displaying for a plurality of unique horizontal ranges for each of a plurality of sonar returns received over a period of time.

12. A method according to claim 11 wherein said plurality of unique horizontal ranges $R_H$ span the minimum to maximum range of said TVSS.

13. A method according to claim 7 further comprising the steps of:

selecting a first of said plurality of data values at one radial range cell $R_R$ satisfying the relationship $$R_R < \left(\frac{R_H}{\cos\varphi}\right);$$

selecting a second of said plurality of data values at another radial range cell $R_R$ satisfying the relationship $$R_R > \left(\frac{R_H}{\cos\varphi}\right);$$

and interpolating between said first and said second of said plurality of data values to determine $B_i(R_H)$.

14. A method according to claim 7 further comprising the step of selecting a nearest-integer radial range cell $R_R$ designated by $$\left(\frac{R_H}{\cos\varphi}\right)$$

wherein said one of said plurality of data values is designated by said nearest-integer radial range cell $R_R$.

* * * * *